3,480,141
PHOTOELECTRIC SYSTEM FOR GRADING OBJECTS ACCORDING TO LENGTH AND WIDTH
Frank C. Rock, Jr., Santa Rosa, Calif., assignor to George E. Lauer, Oakland, Calif.
Filed Aug. 30, 1967, Ser. No. 664,485
Int. Cl. B07c 1/14, 5/10, 3/14
U.S. Cl. 209—80                                18 Claims

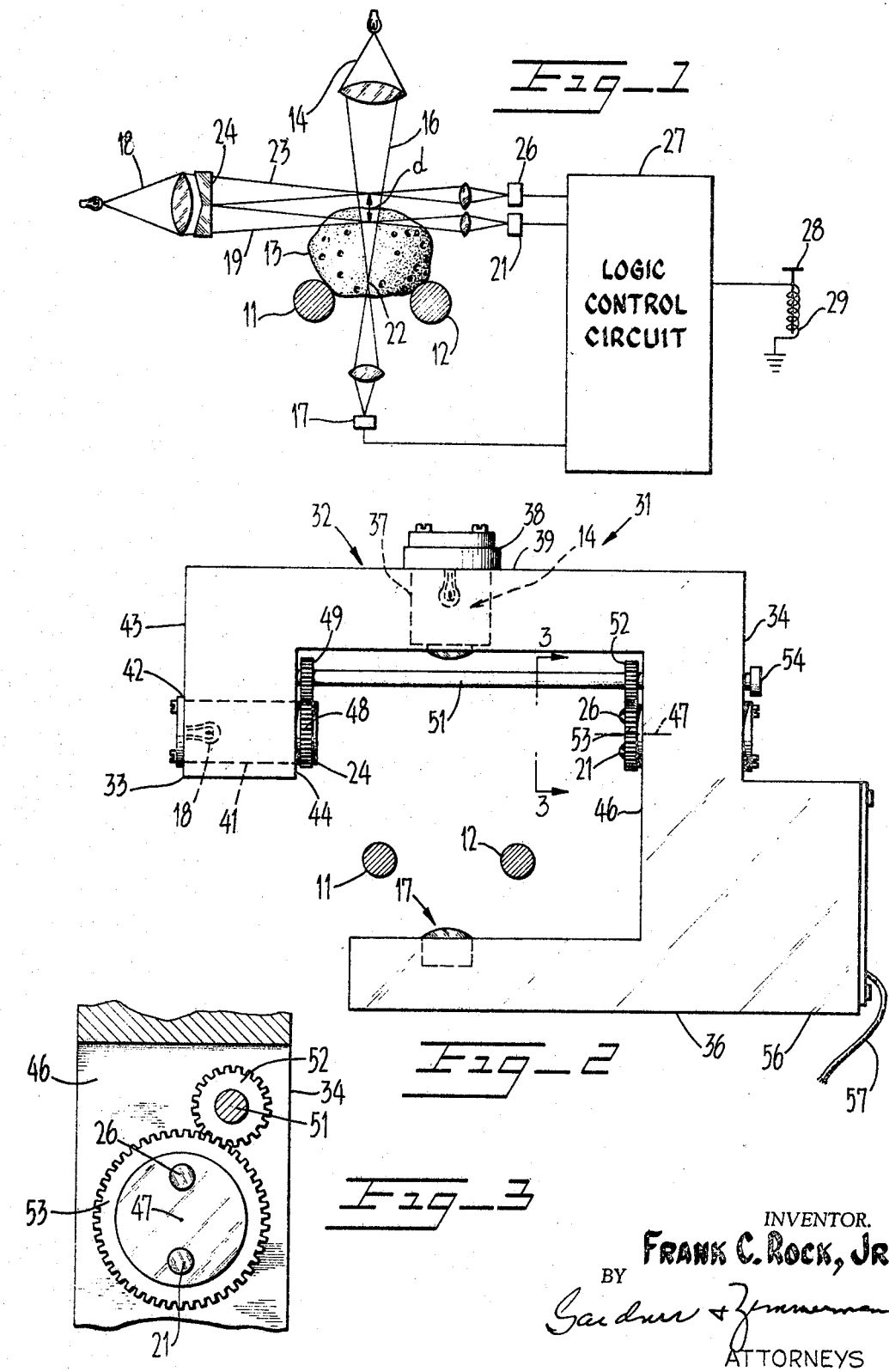

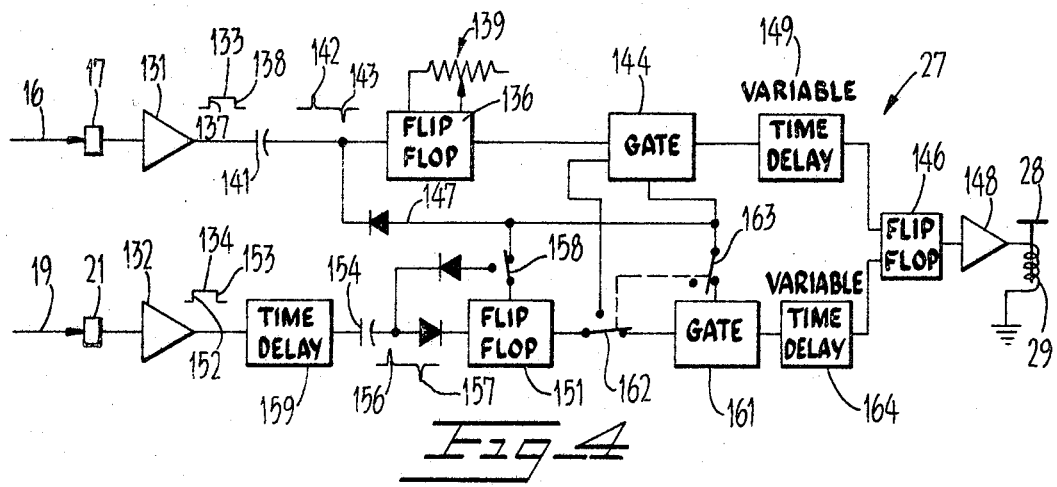
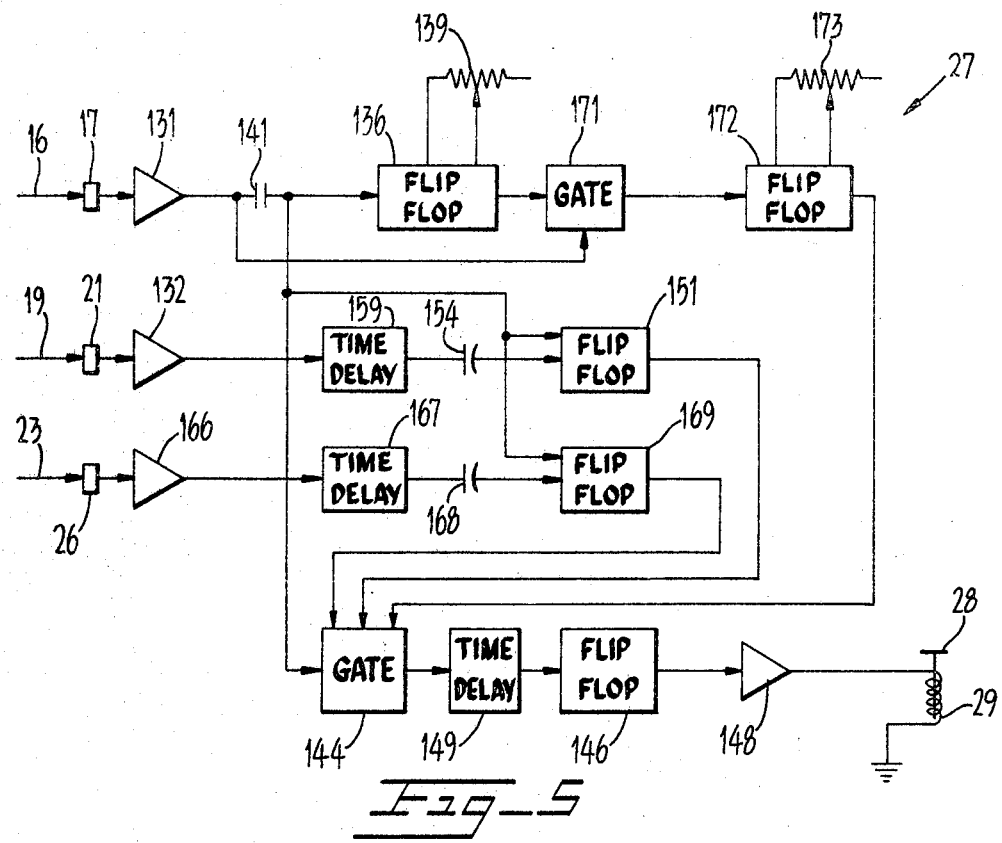
INVENTOR.
FRANK C. ROCK, JR.

ABSTRACT OF THE DISCLOSURE

A first light beam from a source is projected vertically downward transverse to a conveyor transporting at a selected velocity, objects to be graded. A photoelectric cell is located subjacent the conveyor to receive the vertically projected light beam. The cell provides signals of durations equal to the periods which objects interrupt the vertically projected light beam. A second source and associated inverse prism provides two vertically spaced apart light beams horizontally projected at selected elevations above the conveyor. Each of the horizontally projected light beams impinge an associated photoelectric cell which provides a signal indicative of the interruption of the respective light beam by objects transported by the conveyor. The signals from the three cells are coupled to a logic control circuit selectively adapted to actuate an ejector to displace objects from the conveyor in accordance with certain predetermined combinations of signals issued by the cells.

Background of the invention

In my United States Patent 3,282,419, a photoelectric system for automatically grading irregularly shaped objects moving rapidly along a conveyor is described which employs three light beams and associated photoelectric transducers to sense the length and width of the objects. In that grading system, two light beams and associated photoelectric transducers are positioned at predetermined longitudinally spaced positions along the conveyor to measure the length of transported objects, and a single light beam and associated photoelectric transducer is arranged to measure the width of the objects transported by the conveyor. In use, the system is able to sort only objects which are either greater or smaller than a predetermined size.

Within its capabilities, the system subject of my above-identified patent performs satisfactorily in most cases. Unfortunately, however, in circumstances when two small objects are close together on the conveyor so that one interrupts one beam while the other simultaneously interrupts the other beam, the optical part of the system tends to interpret them to be a single large object. In practice, this was found to occur often in spite of the precautions taken in the design of the electronic control circuit to avoid the misinterpretation of the size of the objects passing through the longitudinally spaced light beams. Such misinterpretations lead to misgradings which, of course, are to be avoided in accurate grading systems, such as, often used in the food processing industry.

Besides the objectionable tendency of misinterpreting two small objects as a single large one, the system subject of my above identified patent will misgrade objects if the system is improperly aligned. The accuracy of that system is particularly sensitive to the relative misalignment of the two length measuring light beams and the lack of straightness of the structure housing and supporting the optical system detecting the size of the objects.

Therefore, considerable advantage is to be gained by the provision of a single and flexible system for grading objects with a minimum of misgrading. Other advantages will be realized where a grading system is provided whose grading accuracy is not influenced by geometrical alignment conditions of the system's structural components.

Summary of the invention

The present invention relates generally to a system for automatically grading objects according to size. More particularly, it relates to a system which is characterized by features which enable the realization of the foregoing advantages, and, thereby, which overcomes many of the limitations and disadvantages of the prior art grading systems.

In accordance with the present invention, a first light beam is projected to traverse a path travelled by objects being graded. A first photoelectric transducer is positioned to receive the light beam projected across the path travelled by the objects. In response to the length of time that each of the objects interrupts the light beam, the photoelectric transducer generates a signal which is representative of the dimension of the object in the direction which the objects travel. A second light beam is projected to traverse the path travelled by the objects and impinge a second photoelectric transducer located at a predetermined transverse distance from the center of the path travelled by the objects. The second photoelectric transducer responds to the interruption of the light beam by an object by providing a signal representative of the dimension of the object transverse to the path travelled by the objects. To separate objects of a predetermined size from the path travelled by the objects, the signals from the photoelectric transducers are coupled to a logic control circuit arranged to actuate an ejector means in accordance with certain signals received from the photoelectric transducers.

The simplicity of the grading system of the present invention is attributed to requiring only two independently functioning light beams and associated photoelectric transducers to sense two dimensions, e.g., the length and the width, of objects transported by a conveyor. Since each combination of light beam and associated photoelectric transducer functions independently of the other combinations to sense a dimension of the objects being graded, the alignment of one light beam relative to the others is not critical to the accuracy of the system. Hence, the structure housing and supporting the optical system can be manufactured at very low tolerances thereby greatly simplifying the production and assembling processes and reducing the manufacturing costs.

The use of a single light beam and associated photoelectric transducer to sense the dimension of the objects in the direction which the objects travel gives rise to the further advantage of overcoming the aforementioned problems of misgrading closely spaced small objects as large objects. This advantageous characteristic is inherent in the system of the present invention since, no matter how small the spacing is between adjacent objects, light will be projected through the spacing and detected by the photoelectric transducers when an interruption of the beam by the objects being graded occurs.

An additional noteworthy advantage accrues to the grading system of the present invention as a result of the single beam technique employed to sense the dimension of the objects in the direction which they travel. This noteworthy advantage is the great sorting flexibility characteristic of the grading system of the present invention. As will become more apparent from the following detailed description, the single beam technique facilitates separating objects from a main flow which are larger than a predetermined size, which are smaller than a predetermined size, or which lie in a predetermined size range.

Accordingly, it is an object of the present invention to provide a system for accurately grading objects according to size.

More particularly, it is an object of the present invention to provide a system for grading objects according to size with a minimum of misgrading.

Another object of this invention is to provide a system for grading objects whose accuracy is not greatly dependent upon geometrical alignment conditions of the structural components of the system.

Still another object of the present invention is to provide an accurate grading system which is easily manufactured and assembled.

Yet another object of the present invention is to provide a low cost automatic system for accurately grading objects according to size.

A further object of the present invention is to provide a flexible system for grading objects which can be adjusted to separate objects from a main flow which are larger or smaller than a predetermined size, or which lie in a predetermined size range.

It is still another object of the present invention to provide a system for grading objects according to size which can sense the size of closely spaced small objects.

Description of the drawings

Referring to the drawings:

FIGURE 1 is a schematic diagram of a photoelectric system in accordance with the present invention as employed in conjunction with a conveyor to grade objects transported thereby.

FIGURE 2 is a side elevation view of one embodiment of the structure housing the photoelectric system of FIGURE 1.

FIGURE 3 is a fragmentary view of the part of FIGURE 2 taken along line 3—3 illustrating the details of the range varying means of the width grading portion of the photoelectric system.

FIGURE 4 is a block diagram of the logic control circuit of FIGURE 1 arranged to sort objects either greater than or less than a predetermined size.

FIGURE 5 is a block diagram of the logic control circuit of FIGURE 1 arranged to sort objects of a size lying within or without a predetermined range.

Description of the preferred embodiments

Considering the present invention in detail and with reference to FIGURE 1, there is shown spaced apart moving lines 11 and 12 forming a rail-type conveyor for carrying potatoes 13, or equivalent irregularly shaped objects for grading. The potatoes are carried at a selected substantial velocity, for example, on the order of 400 feet per minute. At least at one station longitudinally of the conveyor there is provided a photoelectric system for sensing the size of the potatoes 13 for sorting them into selected groups of uniform sizes. The photoelectric system includes a first light source 14 forming a beam 16, preferably of constant intensity. A light beam of constant intensity facilitates the grading of objects closely spaced along the conveyor since any detected deviation in the intensity of the light beam 16 will be interpreted as the interruption or the termination of the interruption of the light beam 16. The beam 16 is projected vertically downward transverse to the path travelled by the potatoes 13 at a location midway between the moving lines 11 and 12. A photoelectric transducer such as a photoelectric cell 17 is positioned subjacent the moving lines to receive the light beam 16 when it traverses without interrupting the path along which the potatoes 13 are transported. The photoelectric cell 17 provides a constant current output when activated by the constant intensity beam 16 impinging thereon. When the potatoes 13 interrupt the beam 16, the photoelectric cell 17 is prevented from being activated and, thereby, provides a signal in the form of a lack of current flow from the cell 17. The duration of this lack of current flow, hence, the width of the pulse is equal to the time that a potato 13 interrupts the beam 16. Consequently, since the velocity of the conveyor lines 11 and 12 is known, the pulse widths of the signals from photoelectric cell 17 are accurate measures of the dimensions, generally the lengths, of the potatoes 13 in the direction of the path along which they are transported by the conveyor lines 11 and 12.

In operation, as the trailing edge of each potato 13 passing through the beam 16 leaves the beam 16, the beam is allowed to impinge and activate the photoelectric cell 17. This terminates the pulse width of the potato length related signal provided by photoelectric cell 17. No matter how small the space is between adjacent potatoes along the conveyor lines 11 and 12, the beam 16 always will be able to reach the photoelectric cell 17 therethrough. This inhibits the photoelectric system from interpreting two small objects as a large one. Therefore, for each potato that passes through the beam 16, a signal accurately representative of its length will be provided by the photoelectric cell 17.

In some grading applications, the sensing of a single dimension may be sufficient. As will be explained in greater detail below, with source 14 and photoelectric cell 17 arranged as described hereinabove, signals are provided by the cell 17 which can be employed to sort objects which have a dimension in the direction in which they are transported or a size which is either greater or smaller than a predetermined size or dimension, or lie within or without a particular range. However, in many food processing applications, objects must be graded in two dimensions in order to accurately determine their sizes. Towards this end, at least a second light source 18 is provided for forming at least a second light beam 19, also of constant intensity. The beam 19 is projected horizontally transverse to the path travelled by the potatoes 13 at a selected elevation, which may be adjustable, above the conveyor lines 11 and 12, and, hence, from the center 22 of the path travelled by the potatoes. A second photoelectric cell 21 is on the side of the conveyor distal the light source 18 to receive the light beam 19 when it traverses without interruption the path along which the potatoes 13 are transported. As in the case of the first photoelectric cell 17, signals are provided by the second photoelectric cell 21 when the beam 19 is interrupted by potatoes 13. The signals provided by cell 21 indicate when the potatoes having widths larger than a size determined by the height of beam 19 above the conveyor pass the location of the horizontally projected beam 19. Hence, the light beam 19 alone will sense and can be employed to sort objects which have a dimension transverse to the direction in which they are transported or a size which is larger than a predetermined size or dimension as determined by the elevation of the beam 19 above the conveyor. Regardles of the size of the potatoes 13 transported by the conveyor lines 11 and 12, the vertically projected light beam 16 will always be interrupted by the potatoes as they pass the location of the beam 16. Therefore, the signals derived from the two photoelectric cells 17 and 22 can be employed together to sort objects which have a dimension transverse to the direction in which they are transported or a size which is smaller than a predetermined size or dimension as determined by the elevation of the beam 19 above the conveyor. Of course, with the two beams 16 and 19 objects can be sorted which have a dimension in the direction in which they are transported lying within or without a predetermined range as represented by the signals from cell 17, and simultaneously a dimension in the direction transverse to the direction in which they are transported either greater than or less than a predetermined size as represented by the presence or absence of signals from cell 21.

It may be desired to sort objects which have dimensions in the direction transverse to the direction in which they are transported which lie within or without a certain range. In such cases a third beam of light 23 of constant intensity would be projected horizontally transverse to the path travelled by the potatoes 13 at a selected distance, $d$, above the second light beam 19. A particularly unique embodiment of the present invention employs a common inverse prism 24 which receives the light emitted by the single source 18 and splits it into the two fixed spaced apart beams 19 and 23. The interruption of the third light beam 23 is sensed by a third photoelectric cell 26 which is positioned on the side of the conveyor distal the light source 18 to receive the light beam 23 when it traverses without interruption the path along which the potatoes 13 are transported. The photoelectric cell 26 functions like the cell 21, providing a signal indicating when the potatoes 13 passing the location of the horizontally projected beam 23 have widths larger than a size determined by the elevation of the beam 23 above the conveyor. Together, the light beams 19 and 23 can be employed to indicate when the width of a potato 13 lies inside or outside the range defined by the different elevations of the beams above the conveyor lines 11 and 12. When potatoes are smaller than the elevation of the beam 19, no signals will be provided by the cells 21 and 26. Signals provided from both of the cells 21 and 26 indicate that the width of the potato is greater than the elevation of the beam 23. When a potato has a width lying within the range defined by the different elevations of the beams 19 and 23, a signal will be provided from only the photoelectric cell 21.

To adjust the width range for sorting, the distance, $d$, between the beams 19 and 23 and the relative positions of the cells 21 and 26 are changed in concert. In the embodiment employing the inverse prism 24 to provide the spaced apart beams 19 and 23, the distance $d$ is adjusted by rotating the prism 24 and cells 21 and 26 together.

To sort potatoes of a predetermined size from a batch of potatoes transported by the conveyor lines 11 and 12 for grading, an electrical circuit means or logic control circuit 27 is connected to receive the signals provided by the cells 17, 21 and 26. The logic control circuit 27 includes circuit components, to be described in greater detail hereinbelow, which are selectively coupled in operative relation to the cells 17, 21 and 26 to control the operation of an ejector 28 in accordance with a selected size determination made by the light beams and associated cells. The ejector is operable to displace potatoes from the conveyor lines 11 and 12 to an adjacently disposed bin, take-off conveyor, or the like. Operation of the ejector 28 is affected by a signal from the logic control circuit 27 which is coupled to energize a solenoid 29. The solenoid 29 activates the ejector 28 to displace the potatoes of a selected size from the conveyor lines 11 and 12.

The photoelectric system of the present invention as described with reference to FIGURE 1 had the length sensing light beam 16 and associated photoelectric cell 17 orientated vertically of the conveyor, and the width sensing light beams 19 and 23 and associated cells 21 and 26 orientated horizontally of the conveyor. However, other orientations of the beams and associated cells are contemplated within the scope of the present invention. In fact, the particular orientation of the beams and associated cells often is dictated by the shape of the objects being graded, and in some cases the object shape may require different orientations than described in detail hereinabove. For example, when grading pear halves, it is desirable to orientate the beams 19 and 23 and the associated cells 21 and 26 vertically at a position laterally adjacent either of the edges of the conveyor proximate lines 11 or 12. Furthermore, if a belt-type conveyor is used, the length sensing beam 16 and associated cell 17 would be orientated horizontally at a level upwardly adjacent the surface thereof.

A number of photoelectric systems as described above may be provided at intervals along the convey lines 11 and 12. Each of the photoelectric systems may be set to sense and eject objects of certain sizes from the conveyor lines different from other systems so that they may be sorted according to size as they are transported by the conveyor lines.

With reference to FIGURES 2 and 3, one embodiment of the present invention has a unitized structure 31 housing the photoelectric system for grading objects transported by conveyor lines 11 and 12 in the manner generally outline hereinabove with reference to FIGURE 1. More particularly, the unitized structure 31 is located at least at one position longitudinally of the conveyor lines 11 and 12 and includes a transverse web portion 32 which bridges the conveyor lines. Parallel spaced side arm portions 33 and 34 depend from opposite ends of the web portion 32. The side arm portion 33 terminates just above the conveyor lines 11 and 12. The side arm portion 34 is provided at its lower end with a horizontal shelf 36 which is subjacent the conveyor lines 11 and 12 and extends towards the side arm portion 33 to a position on the side of the conveyor lines 11 and 12 distal that side arm portion 34.

The light source 14 providing the length sensing light beam is removably housed within a chamber region 37 located centrally in the web portion 32. The light source 14 is removable from the chamber 37 through the capped port 38 located at the top side 39 of the web portion 32. The length sensing photoelectric cell 17 is located in the horizontal shelf 36 vertically opposite light source 14. The light source 14 and cell 17 are aligned along a vertical line passing midway between the conveyor lines 11 and 12.

The side arm portion 33 is provided with a chamber region 41 for housing the light source 18 providing the width sensing light beam at an elevation upwardly adjacent the conveyor lines 11 and 12. The light source 18 is removeable from the chamber 41 through the capped port 42 located at the outer side 43 of the side arm portion 33. The inverse prism 24 is rotatably mounted at the inner side 44 of the side arm portion 33 to provide the vertically spaced apart width sensing horizontally projected light beams.

The two width sensing photoelectric cells 21 and 26 are mounted spaced apart at the inner side 46 of the side arm portion 34. The cells 21 and 26 are mounted at diametrically opposite sides of a common axis 47 about which they collectively are rotated to adjust the vertical spacing therebetween in concert with the adjustment of the vertical spacing of the width sensing beams affected by the rotation of the inverse prism 24. In the embodiment of FIGURES 2 and 3, selective rotation of the inverse prism 24 and cells 21 and 26 is accomplished by mounting the inverse prism 24 within a spur gear 48 rotatably mounted to the inner side 44 of the side arm portion 33. The spur gear is driven by a first driven gear 49 fixed to a drive shaft 51 journally mounted to the side arm portions 33 and 34. The drive shaft 51 also is provided with a second driven gear 52 which drives a second spur gear 53 rotatably mounted to the inner side 46 of the side arm portion 34. The photoelectric cells 21 and 26 are mounted within the spur gear 53 at diametrically opposite positions thereof. So as not to interfere with the light beam projected by the source 14, the drive shaft 51 and driven gears 49 and 52 are located forward of the side arm portions 33 and 34. To selectively rotate the drive shaft 51, hence, both spur gears 48 and 53, a manually operable knob 54 is fixed to one end of the drive shaft 51.

Considering now the logic control circuit 27, the circuit components thereof are housed within the lower portion 56 of the side arm portion 34 and are coupled to the photoelectric cells 17, 21 and 26 by disconnectable cables (not shown). The logic control circuit 27 is coupled to activate the ejector 28 by cable 57.

Considering the detailed circuit relationships of the components of an embodiment of the logic control circuit 27 suitable for controlling the operation of the ejector 28 in accordance with certain signals received from photoelectric cells 17, 21 and 26, attention is directed first to FIGURE 4. FIGURE 4 illustrates the circuit components arrangement for operating ejector 28 to displace potatoes from the conveyor lines 11 and 12 which are greater or less than a predetermined size. The length and width sensing photoelectric cells 17 and 21 are respectively connected to the input of their associated length and width amplifiers 131 and 132. The amplifiers 131 and 132 are normally in the "on" state as a consequence of the constant current output provided by the associated photoelectric cells being activated by the light beams 16 and 19 which traverse the conveyor lines 11 and 12 without being interrupted by objects thereon. When the light beams 16 and 19 are interrupted, the amplifiers 131 and 132 are set in the "off" conduction state thereby each forming one of the pulses 133 and 134, for example, positive in sense, which persist for the duration that its associated light beam is interrupted by the object. The output pulse 133 from the length amplifier 131 is coupled to control the conduction state of a flip-flop 136, for example, a monostable multivibrator which is reset in the stable conduction state and set in the quasi-stable conduction state. The leading or positive going edge 137 of the output pulse 133 sets the flip-flop 136 in the quasi stable state. The flip-flop 136 remains in quasi-stable set conduction state either for a period $t_L$, the normal quasi-stable conduction period at the end of which the flip-flop 136 returns to the stable reset conduction state as a result of its own regenerative action, or for a period $t_P$, the duration that the length sensing beam is interrupted at the end of which the flip-flop 136 is triggered by the trailing or leading edge 138 of the output pulse 133 to the stable reset conduction state, whichever is shorter. The period $t_L$ may be changed by adjusting the tapped resistor 139 which controls the regenerative action of flip-flop 136. So that the flip-flop 136 isn't locked in the quasi-stable set conduction state by the output pulse 133 from the length amplifier 131, a capacitor on equivalent differentiating means 141 is serially connected between the length amplifier 131 and flip-flop 136. The capacitor differentiating means 141 generates short duration positive and negative spike pulses 142 and 143 in correspondence with leading and trailing edges 137 and 138 of the output pulse 133. The positive spike pulse 142 is coupled to set flip-flop 136 in quasi-stable state while the negative spike pulse 143 is coupled to reset the flip-flop 136 in the stable state.

The output of the flip-flop 136 is coupled to an AND gate 144. The AND gate 144 provides a pulse to trigger the flip-flop 146 to activate the ejector 28 when a certain time coincidence of inputs to the gate exists. For example, when potatoes having a length larger than a predetermined size are to be ejected from the conveyor lines 11 and 12, a time coincidence must exist between the negative spike pulse 143 coupled to gate 144 through the unidirectional conduction path 147 and the output of the flip-flop 136 when reset in the stable state. For this condition to exist, the flip-flop 136 must be reset by its own regenerative action prior to the termination of the interruption of the light beam 16 by the potato whose length is being sensed, i.e., $t_P > t_L$. On the other hand, if potatoes having lengths less than a predetermined size are to be ejected from the conveyor lines 11 and 12, the AND gate 144 is connected so that a time coincidence must exist between the negative pulse 143 and the output of the flip-flop 136 when set in the stable state. This condition exists when the flip-flop 136 is reset by the negative spike pulse 143, i.e., the interruption of the light beam 16 by the potato is terminated before the flip-flop 136 is reset by its own regenerative action, or $t_P < t_L$.

In either of the above cases, the pulse from the AND gate 144 triggers the monostable flip-flop 146 to the quasi-stable set state for a time equal to $t_s$. During the period $t_s$, the ejector 28 is activated by the solenoid 29 to be positioned to deflect the potato from the conveyor lines 11 and 12. At the end of the time $t_s$, the flip-flop 146 is reset to its stable state by its regenerative action and the ejector 28 is returned to its home position. The components of the monostable flip-flop 146 are adjusted in accordance with the velocity of the conveyor lines 11 and 12, the size of the potatoes to be ejected, and the distance between the location of the ejector 28 and sensing light beam so that the time $t_s$ corresponds to that required for the potato to be transported from the sensing light beam 16 to the location of the ejector 28.

To insure that sufficient excitation current is provided to the solenoid 29, the output of the flip-flop 146 is amplified by amplifier 148 prior to being coupled to solenoid 29.

An ejector 28 in proper position to eject long potatoes from the conveyor lines 11 and 12 may react too soon in the case of sorting small potatoes, possibly ejecting a preceeding potato. To facilitate synchronizing the operation of the ejector 28 with the progress along the conveyor of the potato to be ejected therefrom, a variable time delay 149 may be provided between AND gate 144 and flip-flop 146. The use of the variable time delay 149 particularly simplifies changing the operation of the system from sorting large objects to sorting small objects and vice versa.

To sort potatoes according to their width dimension, the output pulse 134 from the width amplifier 132 is coupled to control the conduction state of a flip-flop 151, for example, a bistable multivibrator which is normally reset in a first of its stable conduction states and set in the second of its stable conduction states. When grading potatoes according only to their widths, the leading or positive going edge 152 of the output pulse 134 sets the flip-flop 151 and the trailing or negative going edge 153 resets the flip-flop 151. As in the case of controlling the conduction state of flip-flop 136, a capacitor type differentiating means 154 receives the output pulse 134 and provides positive and negative spike pulses 155 and 157 corresponding to the leading and trailing edges 152 and 153 of the pulse 134. When grading potatoes according both to their lengths and to their widths, the negative spike pulse from the capacitor differentiating means 141 is connected to reset the flip-flop 151. To selectively connect and disconnect the negative spike pulses provided by the differentiating means 141 and 154 from the reset input of the flip-flop 151, a single-pole-single-throw switch 518 is serially connected between the unidirectional conduction path 147 and differentiating means 154, and the flip-flop 151.

The setting of the flip-flop 151 into the second of its two stable conduction stables results from an interruption by a potato of the light beam 19 impinging the photoelectric cell 21. This interruption indicates a potato of a width larger than the predetermined width dictated by the location of the associated light beam 19 relative to the center of the path followed by the potatoes transported by the conveyor lines 11 and 12. Transient interruptions of the width sensing light beam 19, such as caused by an abnormal protruding potato portion, will cause the width sensing photoelectric cell 21 to give a false indication of the true overall width of the potato. To prevent such abnormalities from causing such false indications and, hence, further minimizing misgradings, a time delay 159 is inserted serially between the width amplifier 132 and the capacitor differentiating means 154. The time delay 159 is of the type which only delays the leading edge 152 of a pulse from the width amplifier 132 and has no effect on the trailing edge 153. Hence, if the duration of the interruption of the width sensing light beam 19 is shorter than the time delay, such as when the aforedescribed transient interruptions occur, the pulse 134 from the width amplifier 132 terminates before the issuance of a pulse from the time delay 159 to the differentiating means 154. As a result, the flip-flop 151 will not be triggered to the set stable conduction state. As will become more apparent from the following description, this prevents the ejection of potatoes which have widths which are smaller than the desired size.

The output of the flip-flop 151 is coupled to one of the two AND gates 144 and 161 depending upon the sorting operation to be performed. When sorting objects according to only their widths, or according to particular lengths or particular widths, the switches 162 and 163 are set to connect the AND gate 161 to receive inputs from the flip-flop 151 and the unidirectional conduction path 147. As in the case of AND gate 144, the AND gate 161 is connected through a variable time delay 164 to trigger the flip-flop 146 to activate the ejector 28 when a certain time coincidence of inputs to the gate 161 exists. For example, if potatoes having a width greater than a predetermined size are to be ejected from the conveyor lines 11 and 12, a time coincidence must exist between the negative spike pulse 143 and the output of the flip-flop 151 when set in the second stable conduction state. On the other hand, if potatoes having widths less than a predetermined size are to be ejected, the AND gate 161 is connected so that a time coincidence must exist between the negative spike pulse 143 and the output of the flip-flop 151 when reset in its normal first stable conduction state. If potatoes are to be ejected from the conveyor lines 11 and 12 which have either a width greater than a predetermined size or a length greater than a predetermined size, or having either a width less than a predetermined size or a length greater than a predetermined size, the variable time delays 149 and 164 are connected so that the flip-flop 146 is triggered to operate the ejector 28 when a suitable time coincidence of inputs exists at either of the AND gates 144 and 161. Of course, the AND gates 136 and 151 can be connected to provide pulses to initiate the operation of the ejector 28 in accordance with any length-width "or" combination, i.e., length greater than or width less than predetermined dimensions, or length less than or width greater than predetermined dimensions.

When objects are to be sorted according to combinations of length and width dimensions, switches 162 and 163 would be set to disconnect AND gate 161 from both the flip-flop 151 and the unidirectional conduction path 147 and connect the flip-flop 151 to the AND gate 144. The AND gate 144 would be connected to provide a pulse to initiate the operation of the ejector 28 in accordance with a certain time coincidence of inputs from the flip-flops 136 and 151 and the negative spike pulse 143. As explained hereinbefore the outputs of the flip-flops 136 and 151 will be different when potatoes pass the grading station which have lengths and widths greater than a predetermined size than when potatoes having lengths and widths less than the predetermined size pass the grading station. Since AND gate 144 can be connected to respond to any of the possible combinations of outputs from flip-flops 136 and 151, the objects transported by the conveyor lines 11 and 12 can be graded in accordance with any combination of length and width dimensions. For example, if potatoes having length and width dimensions greater than a predetermined length and width are to be sorted from the potatoes transported by the conveyor lines, the AND gate 144 would be connected to provide an ejection initiating pulse when a time coincidence existed between the negative spike pulse 143, the output of the monostable flip-flop 136 when reset in the stable conduction state, and the output of the bistable flip-flop 151 when set in the second stable conduction state.

When it is desired to sort objects according to lengths and widths within a predetermined range, the logic control circuit 27 illustrated in FIGURE 4 is modified as shown in FIGURE 5. In such sorting operations, the photoelectric cell 21 and associated light beam 19 are positioned at the lower elevation above the conveyor lines 11 and 12 to provide a signal indicative of whether or not the widths of potatoes passing the grading station are larger than the predetermined lower limit width represented by the elevation of the cell 21 and associated light beam 19 above the conveyor lines 11 and 12. As in the control circuit embodiment of FIGURE 4, the photoelectric cell 21 is operatively associated with the width amplifier 132, time delay 157, capacitor differentiating means 154, and flip-flop 151 to provide a signal to control the state of the AND gate 144. The width amplifier 132, time delay 152, differentiating means 154, and flip-flop 151 are connected to function identically as described hereinbefore with reference to FIGURE 4.

To obtain an indication of the width of the potatoes passing the grading station relative to a predetermined upper limit width, the photoelectric cell 26 and associated light beam 23 are positioned at a second elevation above the conveyor lines 11 and 12 spaced above cell 21 and its associated beam 19 by a predetermined amount. The photoelectric cell 26 is operatively associated with a second width amplifier 166, time delay 167, capacitor differentiating means 168, and bistable flip-flop 169 to provide a signal to control the state of the AND gate 144. The width amplifier 166, time delay 167, differentiating means 168, and flip-flop 169 are connected to function together in the same way as the corresponding circuit components do which are operatively associated with the photoelectric cell 21.

The outputs of the flip-flops 151 and 169 together provide an indication if the width dimension of a potato is greater than the upper width limit determined by the elevation of the cell 26 and associated light beam 23, less than the lower width limit determined by the elevation of the cell 21 and associated light beam 19, or within the range defined by the different elevation of the cells 21 and 26 and their associated light beams 19 and 23. When the width of a potato is greater than the upper width limit, both of the width sensing light beams are interrupted thereby causing both of the flip-flops 151 and 169 to be set in their second stable conduction states. If the width of a potato is less than the lower width limit, neither of the width sensing light beams are interrupted. Hence, both of the flip-flops 151 and 169 remain reset in their first stable conduction states. However, if the width of a potato lies within the predetermined range, the light beam 19 associated with the lower elevation photoelectric cell 21 is interrupted while the light beam 23 associated with the higher elevation photoelectric cell 26 is uninterrupted. When this occurs, the flip-flop 151 is set in its second stable conduction state while the flip-flop 169 remains reset in its first stable conduction state.

If it is desired to grade potatoes according to widths lying within or without the range defined by the different elevations of the cells 21 and 26 and their associated light beams 19 and 23, the outputs of the flip-flops 151 and 169 would be coupled to the ejector activating electronic gate 144. The electronic gate 144 would be arranged to provide a pulse for initiating the activation of the ejector 28 in accordance with selected combinations of output signals issued by the flip-flops 151 and 169. For example, if potatoes are to be sorted which have widths lying within the predetermined range, an AND gate would be connected to provide the ejector activating pulse in response to simultaneous inputs from the flip-flops 151 and 169 corresponding to a reset state of flip-flop 169 and a set state of flip-flop 151. On the other hand, if potatoes are to be sorted which have widths lying without the predetermined range, an OR gate would be connected to provide the ejector activating pulse when the flip-flops 151 and 169 either are both set in the second stable conduction (both width sensing light beams 19 and 23 interrupted indicating that potatoe's width is larger than the maximum width limit) or both reset in the first stable conduction state (neither width sensing light beams 19 and 23 interrupted indicating that potato width is smaller than the minimum width limit).

To provide the capability of grading potatoes according to a predetermined length range, an additional AND gate 171 and an additional monostable flip-flop 172 are serially interposed in circuit connection between the flip-flop 136 operatively associated with the length sensing photoelectric cell 17 and the ejector activating electronic gate 144. More particularly, the photoelectric cell 17 is operatively associated with the length amplifier 132, capacitor differentiating means 141 and flip-flop 136 to function in the same manner as described with reference to FIGURE 4. The output of the flip-flop 136 is coupled to the AND gate 171. The AND gate 171 also receives the pulse output from the length amplifier 131. The pulse output from the length amplifier 131 gates the AND gate 171 open for the duration of the interruption of the length sensing beam by a potato thereby coupling the output of the flip-flop 136 to the set input of flip-flop 172. If the flip-flop 136 resets during the interruption of the length sensing beam, hence, while the AND gate 171 is open as a result of its regenerative action, the monostable flip-flop 172 is set in the quasi-stable conduction state. The flip-flop 172 remains set in the quasi-stable conduction state for a period of $t_r$ at the end of which it returns to the stable reset conduction state as a result of its own regenerative action. The quasi-stable conduction period, $t_r$, may be changed by adjusting the topped resistor 173 which controls the regenerative action of the flip-flop 172. The output of the flip-flop 172 is coupled to the AND gate 144 which also receives the spike pulse from the differentiating means 141 upon the termination of the interruption of the length sensing beam 16. The AND gate 144 provides the ejection initiating pulse if a certain time coincidence exists between the inputs to the gate. When it is desired to sort objects having a length lying within a predetermined range, a time coincidence must exist between the spike pulse and the output of the flip-flop 172 when set in the quasi-stable conduction state. As explained hereinabove, the operation of the flip-flops 136 and 172 together with the AND gate 171 results in the quasi-stable conducting state output of the flip-flop 172 to begin at the end of the quasi-stable conduction state of the flip-flop 136, i.e., a time $t_L$ after the interruption of the length sensing light beam. Hence, such a time coincidence exists for potatoes having a length which interrupt the length sensing light beam 16 for a period $t$ which lies in the range defined by the inequality $t_L < t < (t_L + t_r)$.

On the other hand, if potatoes are to be sorted which have a length lying outside a particular range, the AND gate 144 would be connected to provide the ejection initiating pulse when a time coincidence exists between the spoke pulse generated at the termination of the interruption of the length sensing light beam 16 and the output of the flip-flop 172 when reset in its stable conduction state.

In any of the operations which involve sorting objects according to dimensions or sizes lying within a predetermined range, the activation of the ejector 28 can be accomplished in the manner described with reference to FIGURE 4. The pulse output of the gate 144 is coupled through the time delay 149 to trigger the flip-flop 146 to provide an output for activating the ejector 28. The flip-flop 146 is coupled through the amplifier 148 to excite the solenoid 29 to cause the ejector 28 to deflect potatoes from the conveyor lines 11 and 12.

As previously noted, often it is desirable to grade potatoes according to both their lengths and widths in order to accurately sort them according to size, for example, as defined by lengths and widths lying in certain ranges. In such cases, the AND gate 144 would be coupled to receive the outputs from the flip-flops 151, 169 and 172 and the negative spike pulse issued by the capacitor differentiating means 141. The AND gate 144 would be connected to provide the ejection initiating pulse when a time coincidence existed between the negative spike pulse, the output of the flip-flop 169 when reset in the first stable conduction state, the output of the flip-flop 151 when set in the second stable conduction state, and the output of the flip-flop 172 when set in the quasi-stable conduction state.

As is readily apparent from the foregoing description of the photoelectric system of the present invention as operated to perform some of the more common grading and sorting operations, the present invention is an extremely flexible and accurate grading system which is considerably simpler than that subject of my above identified patent and other prior art grading systems. Although the photoelectric grading system of the present invention was specifically described in terms of certain common grading operations, many others are possible.

What is claimed is:

1. A photoelectric system for grading objects according to size comprising a first light source forming a first light beam projected transversely of a position through which said objects directed along a path are passed, an associated first photoelectric transducer located on the side of the objects passing through said position distal the light source for receiving said first light beam and providing a first electrical signal when said first light beam is interrupted by objects passing said position representative of the duration that said first light beam is interrupted and thereby of the dimension of the object in the direction in which the object is passed through said first light beam, at least a second light source and an associated second photoelectric transducer, said second light source forming a second light beam projected transversely of said position through which said objects are passed at a predetermined transverse distance relative to the path of the objects, said second photoelectric transducer located on the side of the object passed through said position distal said second light source for receiving said second light beam and providing a second electrical signal in response to the object passing the position thereof representative of the dimension of the object in the direction transverse of the direction in which the object is passed through the light beams, and electrical circuit means responsive to the signals issued by said photoelectric transducers to provide a control signal when the signals issued by said photoelectric transducers are representative of objects having selected dimensions, said light sources being positioned to direct their respective light beams generally perpendicular to each other and in generally intersecting paths.

2. The photoelectric grading system according to claim 1 further comprising at least a third light beam and an associated third photoelectric transducer, said third light beam projected transversely of the position through which the objects are passed parallel to said second light beam at a selected perpendicular distance therefrom, said third photoelectric transducer located on the side of the object passed through said position distal from where said third light beam is directed from for receiving said third light beam and providing a third electrical signal in response to objects passing the position thereof representative of the dimension of the object in the direction transverse of the direction in which the object is passed through the light beams, said third electrical signal coupled to said electrical circuit means, said third light beam likewise being in a generally intersecting path with said first light beam.

3. The photoelectric grading system according to claim 2 further comprising means to selectively adjust the perpendicular distance between said second and third light beams and the location of their associated photoelectric transducers in accordance therewith.

4. The photoelectric grading system according to claim 2 further comprising means receiving the light emitted from the second light source for forming the parallelly projected second and third light beams.

5. The photoelectric grading system according to claim 4 wherein said means forming said second and third light beams from the light emitted from said second light source is an inverse prism, and further comprising gear means operable to rotate said inverse prism and the second and third photoelectric transducers collectively to selectively adjust the perpendicular distance between the second and third light beams.

6. The photoelectric grading system according to claim 1 further comprising conveyor means for transporting the objects past the position of said light beams, and ejector means coupled to the output of the electrical circuit means to displace an object from the conveyor means when activated by the control signal generated thereby as a result of the passage of the object through the position of the light beams.

7. The photoelectric grading system according to claim 6 wherein said electrical circuit means includes a first means operatively associated with said first photoelectric transducer to provide a first signal representative of the dimension of the object in the direction in which it is transported by the conveyor relative to a first predetermined reference dimension, a second means operatively associated with said second photoelectric transducer to provide a second signal representative of the dimension of the object in the direction transverse to that in which it is transported by the conveyor relative to a second predetermined reference dimension, and means responsive to the signals provided by said first and second means to generate said control signal when said object has selected dimensions.

8. The photoelectric grading system according to claim 7 wherein said means responsive to the dimension representative signals provides a control signal when an object passing the position of the light beams has a size as represented by at least one of the dimension representative signals which is greater than a reference size determined by the first and second reference dimensions.

9. The photoelectric grading system according to claim 7 wherein said means responsive to the dimension representative signals provides a control signal when an object passing the position of the light beams has a size as represented by at least one of the dimension representative signals which is less than a reference determined by the first and second reference dimensions.

10. The photoelectric grading system according to claim 7 wherein said means responsive to the dimension representative signals provides a control signal when an object passing the position of the light beams has a size as represented by one of the dimension representative signals which is greater than and as represented by the other dimension representative signal which is less than references determined by the first and second reference dimensions.

11. The photoelectric grading system according to claim 7 wherein said first means operatively associated with the photoelectric transducer provides a signal representative of the dimension of the object in the direction in which it is transported by the conveyor relative to a predetermined reference range of dimensions, and said means responsive to the dimension representative signals provides a control signal when an object passing the position of the light beams has a dimension in the direction in which it is transported by the conveyor which lies within the reference range of dimensions.

12. The photoelectric grading system according to claim 6 further comprising at least a third light beam and an associated third photoelectric transducer, said third light beam projected transversely of the position through which the objects are passed parallel to said second light beam at a selected perpendicular distance therefrom, said third photoelectric transducer located on the side of the object passed through said position distal from where said third light beam is directed from for receiving said third light beam and providing a third electrical signal in response to objects passing the position thereof representative of the dimension of the object in the direction transverse of the direction in which the object is transported by the conveyor, and wherein said electrical circuit means includes a first means operatively associated with said first photoelectric transducer to provide a first signal representative of the dimension of the object in the direction in which it is transported by the conveyor relative to a first predetermined reference range of dimensions, a second means operatively associated with said second photoelectric transducer to provide a second signal representative of the dimension of the object in the direction transverse to that in which it is transported by the conveyor relative to a lower reference dimension of a second predetermined reference range of dimensions, a third means operatively associated with said third photoelectric transducer and responsive to the third electrical signal therefrom to provide a third signal representative of the dimension of the object in the direction transverse to that in which it is transported by the conveyor relative to an upper reference dimension of the second predetermined reference range of dimensions, and means responsive to the signals provided by the first, second and third means to generate the control signal when said object has selected dimensions.

13. The photoelectric grading system according to claim 12 wherein said means responsive to the dimension representative signals provides a control signal when an object passing the position of the light beams has a size as represented by at least one of the first dimension representative signal and the combination of the second and third dimension representative signals which lies within a reference size range determined by the first and second reference ranges of dimensions.

14. The photoelectric grading system according to claim 12 wherein said means responsive to the dimension representative signals provides a control signal when an object passing the position of the light beams has a size as represented by at least one of the first dimension representative signal and the combination of the second and third dimension representative signals which lies without a reference size range determined by the first and second reference ranges of dimensions.

15. The photoelectric grading system according to claim 12 wherein said means responsive to the dimension representative signals provides a control signal when an object passing the position of the light beams has dimensions lying within the first and second predetermined reference ranges of dimensions.

16. The photoelectric grading system according to claim 6 further comprising an adjustable time delay means serially interposed between said electrical circuit means and said ejector means for delaying the control signal coupled to said ejector means in accordance with the distance between the position of the light beams and ejector means taken in the direction of the conveyor travel.

17. The photoelectric grading system according to claim 6 further comprising a time delay means serially interposed between said second photoelectric transducer and electrical circuit means for delaying the leading edge of the second electrical signal a selected amount.

18. A unitized structure for housing a photoelectric system for grading objects transported by a conveyor comprising a transverse web portion bridging said conveyor having a top, bottom and end portions, first and second parallel spaced side arms depending from opposite ends of said web portion, a shelf extending inwardly from said first arm transversely of said conveyor subjacent the entire surface thereof, a first light source housed in said web portion and directing a first vertical light beam transverse of the conveyor towards said shelf, a first photoelectric transducer housed in said shelf in receiving relation to said first vertical light beam, a second light source housed in one of said side arms and directing a second horizontal light beam transverse of the conveyor towards the other side arm, a second photoelectric transducer housed in said other side arm in receiving relation to said second horizontal light beam, an inverse prism rotatably mounted in front of one of said first and second light sources and splitting the light received therefrom into the associated light beam and a third light beam parallel thereto and spaced therefrom, a third photoelectric transducer housed in said structure in receiving relation to said third light beam adjacent said photoelectric transducer receiving the parallelly projected light beam, said adjacently housed photoelectric transducers rotatably mounted to said structure, and gear means for selectively rotating collectively and in concert said parallelly projected light beams and associated transducers.

References Cited

UNITED STATES PATENTS

| 3,084,797 | 4/1963 | Niles | 209—82 |
| 3,109,927 | 11/1963 | Lesnett | 209—82 X |
| 3,282,419 | 11/1966 | Rouk | 209—74 |

ALLEN N. KNOWLES, Primary Examiner

RICHARD A. SCHACHER, Assistant Examiner

U.S. Cl. X.R.

209—82, 111.7; 351—156